(12) United States Patent
Nishidate

(10) Patent No.: US 7,276,826 B2
(45) Date of Patent: Oct. 2, 2007

(54) SPINDLE MOTOR AND DISK DRIVE DEVICE

(75) Inventor: Masahiro Nishidate, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 175 days.

(21) Appl. No.: 11/243,609

(22) Filed: Oct. 5, 2005

(65) Prior Publication Data
US 2006/0085807 A1   Apr. 20, 2006

(30) Foreign Application Priority Data
Oct. 6, 2004   (JP) .............................. 2004-293142

(51) Int. Cl.
H02K 5/16 (2006.01)
H02K 5/24 (2006.01)
H02K 7/09 (2006.01)

(52) U.S. Cl. .................. 310/67 R; 310/51; 310/90; 310/90.5

(58) Field of Classification Search .......... 310/51, 310/90, 90.5, 67 R
See application file for complete search history.

(56) References Cited

U.S. PATENT DOCUMENTS

| | | | | |
|---|---|---|---|---|
| 4,900,958 A | * | 2/1990 | Kitahara et al. | 310/67 R |
| 5,300,849 A | * | 4/1994 | Elsasser | 310/90.5 |
| 5,610,462 A | * | 3/1997 | Takahashi | 310/90 |
| 5,623,382 A | * | 4/1997 | Moritan et al. | 360/99.08 |
| 5,748,406 A | * | 5/1998 | Morimoto et al. | 360/99.12 |
| 6,291,916 B1 | * | 9/2001 | Huang et al. | 310/90.5 |
| 6,661,131 B2 | * | 12/2003 | Fukutani | 310/51 |
| 6,738,340 B2 | * | 5/2004 | Hopf et al. | 369/264 |
| 6,911,749 B1 | * | 6/2005 | Ho et al. | 310/67 R |
| 6,954,017 B2 | * | 10/2005 | Takahashi et al. | 310/85 |
| 6,982,505 B2 | * | 1/2006 | Horng et al. | 310/51 |
| 7,002,272 B2 | * | 2/2006 | Tsuchiya | 310/85 |
| 2002/0074879 A1 | * | 6/2002 | Jun | 310/90 |
| 2004/0245873 A1 | * | 12/2004 | Lu et al. | 310/90 |

FOREIGN PATENT DOCUMENTS

JP   9-74705   3/1997
JP   2004-7905   1/2004

* cited by examiner

*Primary Examiner*—Burton Mullins
(74) *Attorney, Agent, or Firm*—Jordan and Hamburg LLP

(57) ABSTRACT

A simple construction causes a spindle motor rotor to be eccentric in a pickup moving direction and improves axial run-out caused by clearance between a rotating shaft and a bearing. A magnetic cap is attached to an end of a bearing of a spindle motor so as to cover an end face. A ceiling of the magnetic cap is an annular magnetic material in which a lid and opposing face protruding therefrom are continuous, and the opposing face works with an annular magnet attached to the rotor to generate an attraction force that causes the rotor to be eccentric. The opposing face is formed so as to be linearly symmetrical with respect to the axis line, which is the pickup movement line.

17 Claims, 4 Drawing Sheets

1   Disk drive
40  Magnetic material
M   Spindle motor
R   Rotor
S   Stator
P   Pickup
X, Y, Z   Axis lines (a)

(b)

SPINDLE MOTOR AND DISK DRIVE DEVICE

TECHNICAL FIELD

The present invention relates to a spindle motor for rotatably driving an optical disk, magneto-optical disk or the like, and a disk drive comprising the spindle motor and an optical read head for reading information recorded on the disk.

BACKGROUND ART

A disk drive comprising a read head for optically reading information recorded on a disk is known as an optical disk/magneto-optical disk drives such as CD, DVD, and MD.

In such a disk drive, an outer rotor type brushless motor is employed as a so-called spindle motor for rotatably driving a disk. A turntable on which a disk is placed is provided on a rotating shaft of the spindle motor so as to rotate integrally therewith, and the rotating shaft is rotatably supported by a bearing on the stator.

A sintered oil-impregnated metal bearing is used; this is because such a bearing is less expensive than a roller bearing and thus can reduce the costs of a motor and device. However, unlike a roller bearing, clearance is required between a metal bearing and rotating shaft, and due to this clearance axial run-out of the rotating shaft becomes larger than that with a roller bearing.

This axial run-out becomes disk surface run-out or disk axial run-out when a disk is rotatably driven, and is the cause of the drawback of a read head becoming unable to accurately read information from a disk.

Various constitutions and methods have been proposed as means for preventing axial run-out of a rotating shaft as above. In particular, the present applicant has filed applications, as in Laid-open Japanese Patent No. 2004-7905, wherein a constant force is exerted on a rotor not only in the rotating shaft direction (the thrust direction) but also in a radial direction using a magnetic force to cause the rotor to be slightly inclined and eccentric in a prescribed direction.

By thus applying a force is applied to a rotor in a prescribed direction, and causing the spindle motor to rotate in a state where the rotor is eccentric in a prescribed direction, axial run-out of a rotating shaft is inhibited and surface run-out and axial run-out of a disk is improved.

On the other hand, in the relative movement of a read head and disk in a disk drive, it is relatively easy for the head follow to disk run-out in the focus direction, and thus signals can be read even with a certain degree of disk run-out. However, in the tracking direction, even though it is possible for the head to follow the disk run-out, greater precision in terms of surface run-out and axial run-out is demanded when compared to the focus direction.

For this reason, a technology is disclosed in Laid-open Japanese Patent No. H09-7905, wherein read head moving direction is correlated with the direction of eccentricity of a spindle motor rotor.

As shown in Japanese Laid-open Patent No. 2004-7905, for a disk drive using an optical read head, a constitution wherein a rotor is eccentric in a head moving direction is considered effective. In such a constitution a prescribed section of a magnetic plate shaped stator core comprising a plurality of stacked magnetic plates is cut away, thereby creating magnetic unbalance with respect to a drive magnet provided on a rotor, thus causing the rotor to be eccentric in a certain direction.

Such a constitution requires not only the processing of each magnetic plate into a prescribed form, but also the assembly of the processed magnetic plates in a set combination. Further, because assembling a stator core as a drive device requires that the assembling direction be determined, such assembly is extremely troublesome.

Further, because a specialized motor is required for a disk drive, the use of such motor is also limited.

SUMMARY OF THE INVENTION

It is an object of the present invention to provide a versatile spindle motor having a simple constitution with a rotor eccentric in a certain direction, and a disk drive using the motor.

The present invention solves the above problems by providing a spindle motor for rotatably driving a disk-shaped recording medium using a brushless motor, comprising a rotor having an annular magnet positioned concentrically with a rotating shaft on a surface orthogonal to the rotating shaft, and a stator having a cylindrical bearing that supports the rotating shaft, wherein the annular magnet has an annular portion having the same radius as that of the bearing rotor side end, an annular magnetic material is provided on the bearing rotor side end so as to cover the end and oppose the annular portion, and the magnetic material has a protrusion formed therein partly protruding toward the annular magnet between the bearing end and annular magnet annular portion.

The rotor side end of the bearing rotatably supporting the rotor rotating shaft is covered with an annular magnetic material, and the magnetic material partly protrudes so as to act on the annular magnet provided on the rotor. Due to attraction between the protrusion and annular magnet, the rotor is made eccentric, and because the annular magnetic material acts as a ceiling covering the bearing end face, scattering of oil is prevented. Further, because the annular magnetic material is attached at a position covering the bearing end face, and the annular magnet can be configured so that the annular portion is positioned on the thickness portion of the bearing end having a prescribed thickness and formed in a cylindrical shape, it has a small and simple constitution without need to increase the size of the magnetic material or the diameter of the annular magnet.

With the constitution according to the invention, because the attaching part and annular magnetic body are formed in a cap shape and the annular magnetic body can be easily attached to the bearing end, the bearing end can be more reliably covered.

With a constitution of a disk drive using such a motor according to the invention, the signals recorded on a disk can be more reliably read. Further, the rotor eccentricity direction can be changed by a simple change of the magnetic material attachment direction, thereby maintaining motor versatility.

According to the present invention, with a simple constitution of an annular magnet and annular magnetic material opposite the annular magnet, scattering of oil can be prevented and a rotor can be reliably eccentric and can be further pulled in an axial direction, thereby providing a small motor that while having improved axial run-out qualities and preventing oil scattering, also has excellent versatility, as well as a disk drive using this motor.

BEST MODE FOR CARRYING OUT THE INVENTION

Figure 1:
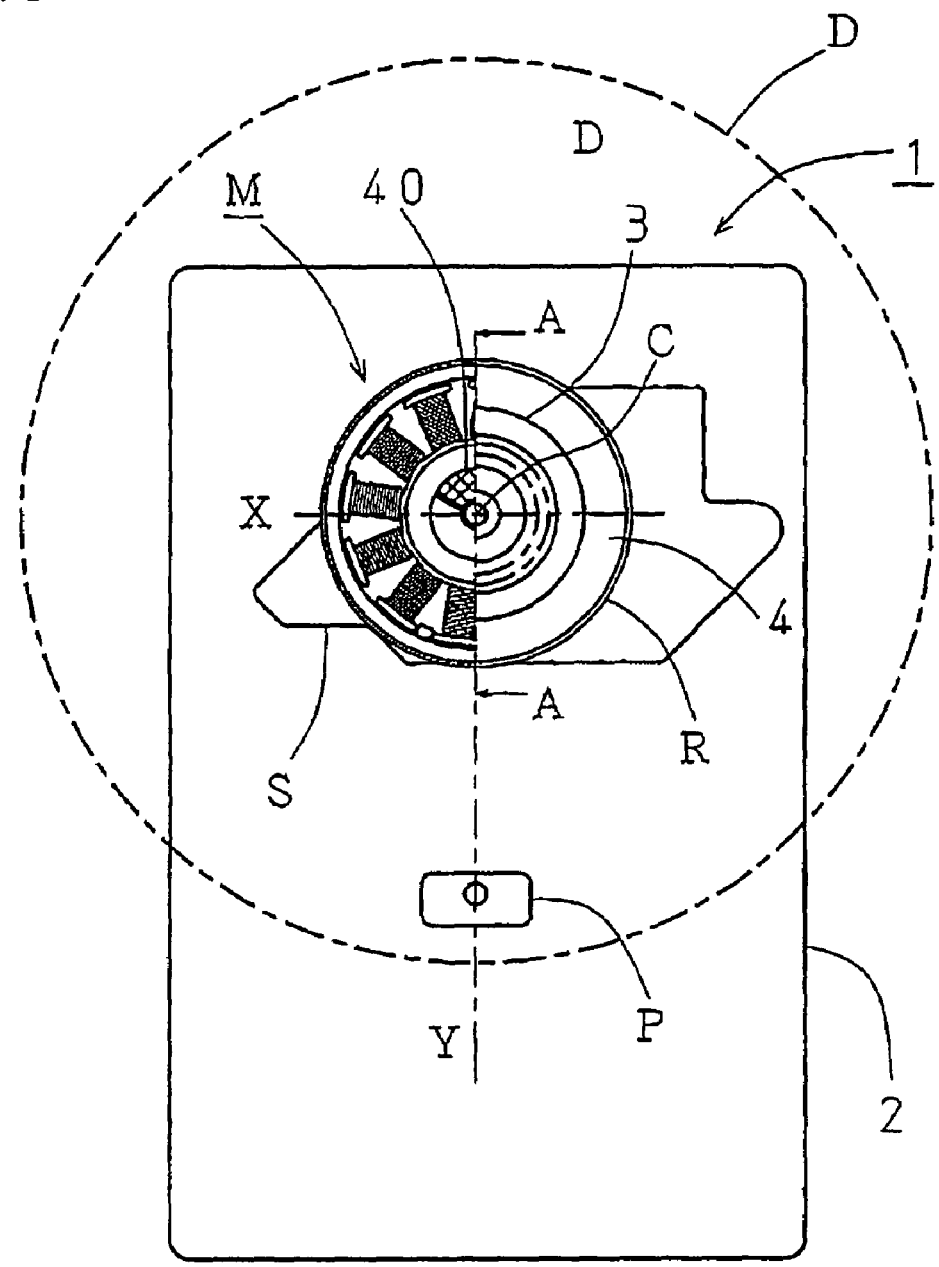
FIG. 1 is a plan view showing a disk drive of the present invention, showing a cross-section of half the rotor along the line AA.

A disk drive according to the present invention will be explained with reference to FIG. 1. FIG. 1 illustrates a plan view showing a disk drive, with a cross-sectional view of half the rotor along the line AA.

A disk drive 1 comprises, on a chassis 2, a spindle motor M and a pickup P that serves as a read head. The pickup P is attached on the chassis 2 so that the optical axis of a laser beam passes through a rotation center C and moves along an axis line Y (first axis line) parallel to the rotary surface of the disk. Explanations of a mechanism to move a pickup, signal processing, a motor drive circuit and the like are omitted, as they do not directly relate to the present invention.

Here, to simplify the explanation, we will designate as line X (second axis line) a line passing through the rotation center C and parallel to the disk rotary surface, and intersecting with the axis line Y at a right angle. Further, we will designate as line Z an axis line (axis line of the spindle motor center of rotation) passing through the rotation center C and orthogonal to the axis line X and axis line Y.

The spindle motor M comprises a stator S and rotor R, the rotor R having a disk guide 3 and friction sheet 4 so as to function as a turntable. The turntable may be fixed on a rotating shaft as a separate body from a rotor case. Such spindle motor constitution will be described later.

A disk D is placed on the turntable comprising the rotor R. The disk D is centered by the disk guide 3, placed on the turntable, and rotated by the spindle motor M at the center of the axis line Z.

Attached to the stator S is a magnetic cap 40, which is a special feature of the present invention, symmetrical along the axis line Y, unsymmetrical along axis line X, and on the side opposite the pickup P with respect to the axis line X (an opposing face 40a [described below] of the magnetic cap 40 is shown by cross-hatching.)

Figure 2:
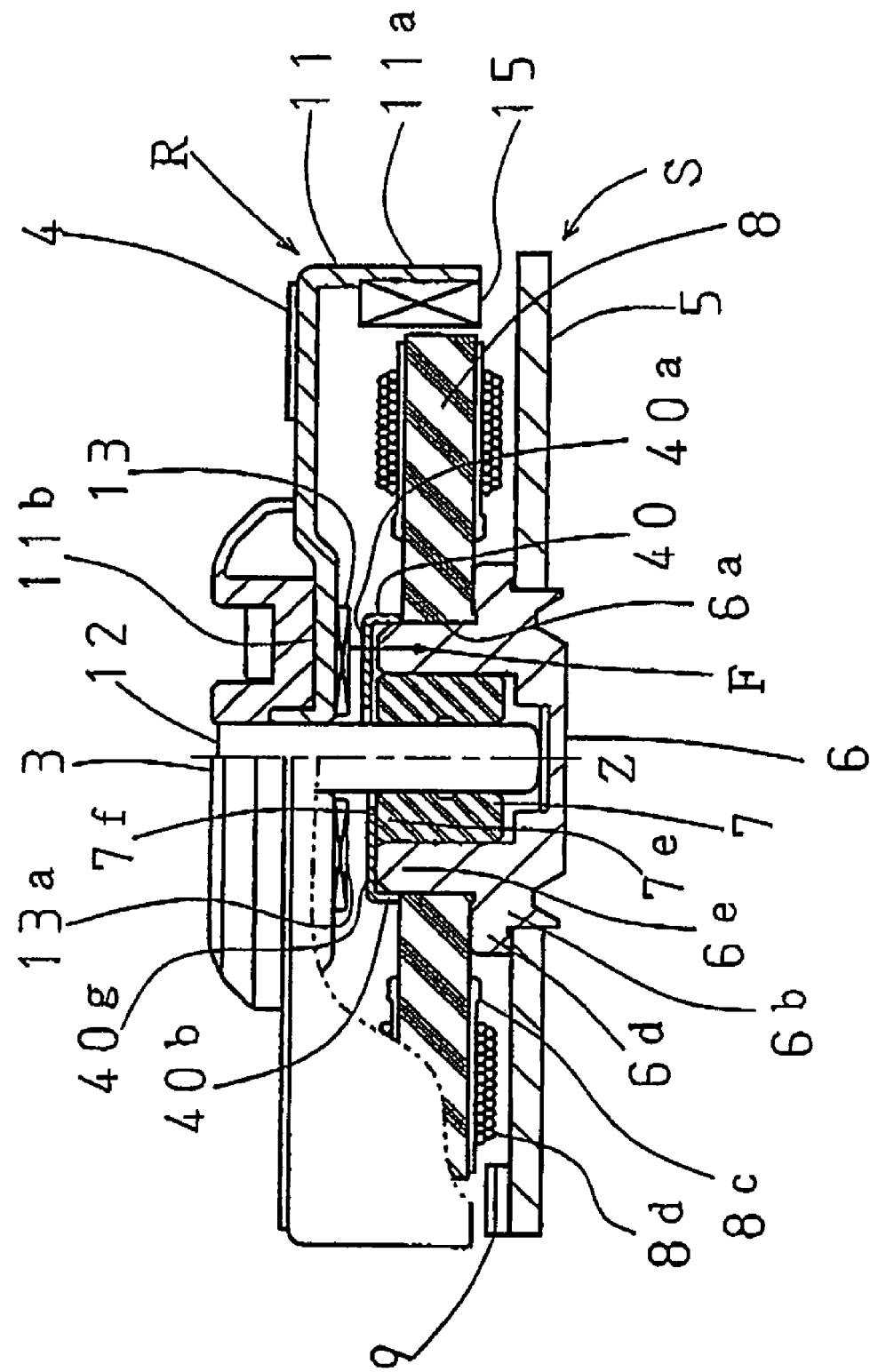
FIG. 2 is a lateral view of a spindle motor used for the disk drive of the present invention, showing a cross section along the line AA.
Figure 3:
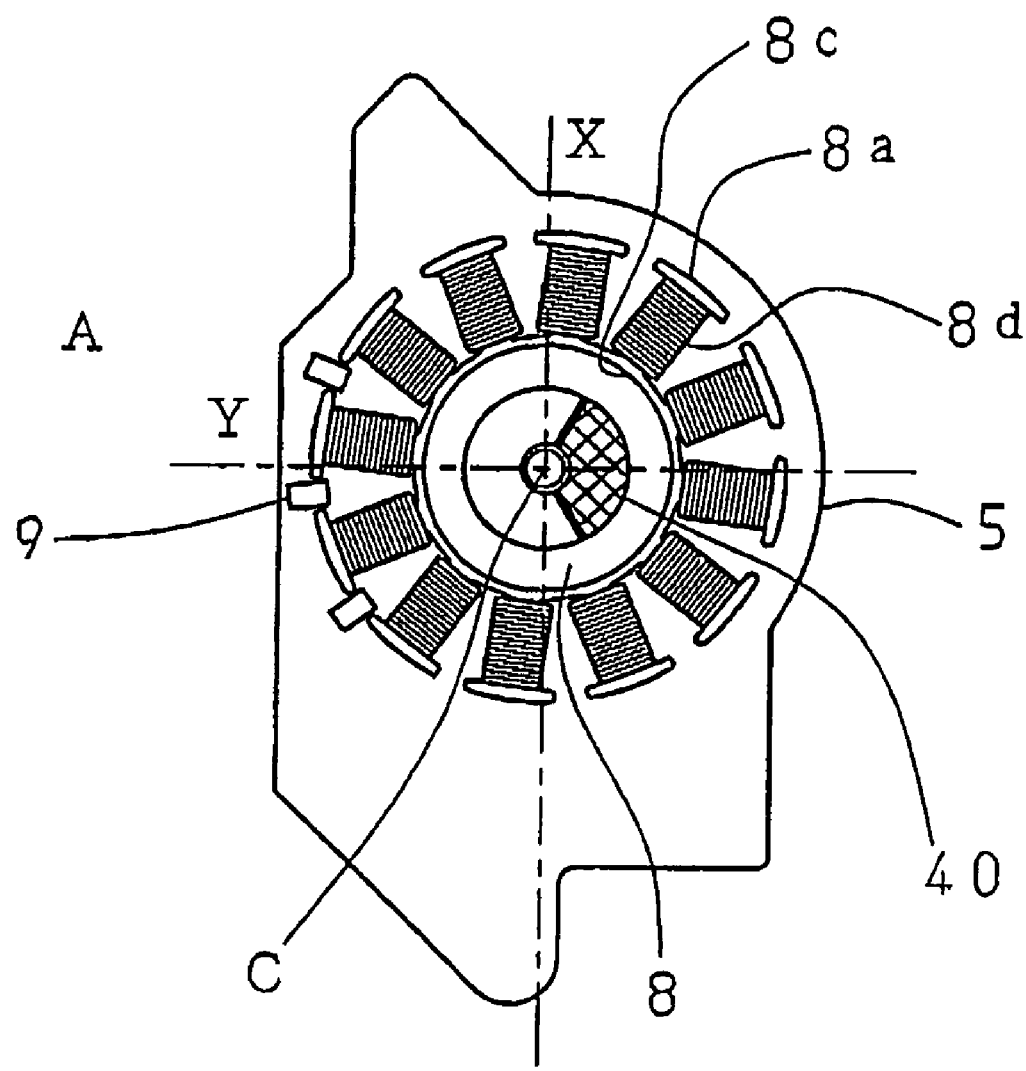
FIG. 3 is a plan view of a stator in a spindle motor used for the disk drive of the present invention.

The spindle motor M used for the disk drive 1 of the present invention will be explained with reference to FIGS. 2 and 3. FIG. 2 illustrates a cross-sectional view of the side along the AA line on the axis line Y. FIG. 3 illustrates a plan view of the stator S.

The stator S comprises a base 5 on which is attached an iron substrate having a printed circuit formed on the surface thereof or a printed wiring board on which iron plates are stacked, and attached to the base, for example, is a brass bearing holder 6 that is machine cut in a cylindrical form. The bearing holder 6 is integrally molded in a cup shape and comprises a cylindrical guide 6a accommodating therein an oil-impregnated metal bearing 7 and to the outside of which a stacked core 8 is attached, a fixing part 6b at which the bearing holder 6 is fixed to the base 5 by crimping or the like, and a holding part 6d for supporting the rotor R in a thrust direction and holding the stacked core 8.

The bearing holder 6 serves to constitute the bearing 7 as a part of the stator. Therefore, the bearing holder 6 can be integrally formed of the same material as that of the bearing, or may be formed of a resin or the like integral with a base material (a base constituting the stator). Various such constitutions are possible, including a constitution where a bearing holder is formed of an iron plate or the like and made integral with the substrate.

For example, the bearing holder 6, in addition to brass, may be formed of resin or metal plate, and in such cases the bearing holder 6 may be formed integral with the base 5. In particular, when the bearing holder 6 is formed of a magnetic plate material, the bearing holder 6 and magnetic cap 40 can be integrally formed by pressing.

The bearing 7 is a bearing in which lubricant is impregnated in cylindrically shaped sintered metal, as is generally used for such a motor. The bearing 7 is fixed to a guide 6a by press insertion or the like. In the embodiment shown in FIG. 2, an end 6e of the bearing holder 6 is attached to an end 7e of the bearing 7 so that the height of the end face is the same as that of the end face 7f of the bearing 7.

The stacked core 8 is fixed on the outer periphery of the guide 6a so that the stacked plates on which a plurality of salient poles 8a are formed are held by the holding part 6d with respect to the base 5. An insulating sheet 8c is inserted in the salient poles 8a, and a coil 8d is wound around each salient pole 8a.

A sensor 9 is a Hall sensor for detecting rotation of a rotor provided on the base 5.

The rotor R comprises a cap-like rotor case 11 formed of a magnetic plate material enabling formation of a magnetic path, a rotating shaft 12 fixed on the rotor case 11 and rotatably supported by the bearing 7, a disk guide 3 formed integrally with the rotor case 11 and rotating shaft 12 so as to cause the rotor R to function as a turntable, and a friction sheet 4.

The rotor case 11 comprises a cylindrical part 11a formed in a cylindrical shape and provided coaxially with the rotating shaft 12, and an upper surface 11b having a surface orthogonal to the rotating shaft 12. A cylindrical drive magnet 15 opposite the salient poles 8a is attached inside the cylindrical part 11a. Further, a disk guide 3 and friction sheet 4 are provided on the upper surface 11b.

On the inner periphery side inner surface of the upper surface 11b, an annular magnet 13 is attached at a position opposite the magnetic cap 40, with the rotating shaft 12 at the center thereof, the annular magnet 13 having a rectangular cross-sectional shape and a surface 13a orthogonal to the shaft 12. This annular magnet 13 is magnetized into two poles, N and S, in the axis line Z direction.

This annular magnet 13 is attached to the upper surface 11b of the rotor case 11, but no such limitation is imposed. For example, in a configuration such that the disk guide 3 having the center of the upper surface 11b as a circular opening is integrally formed from resin, the annular magnet 13 may be attached at a position opposite the magnetic cap 40 of the disk guide 3.

Further, the inner diameter of the annular magnet 13 into which the rotating shaft 12 is inserted is configured to be the same size as the opening 40c of the magnetic cap 40 or slightly smaller, and the outer diameter thereof is configured slightly larger than the outer diameter of the magnetic cap 40. In a case where the magnetic cap 40 is attached to the end 6e of the bearing holder 6, the diameter thereof is relatively large. As a result, the attractive force F caused by the annular magnet 13 becomes large.

In a case where the end 7e of the bearing 7 is formed in a shape so as to protrude past the end 6e of the bearing holder 6 and the magnetic cap 40 is directly attached to the bearing 7, the outer diameter of the annular magnet 13 (even if it is relatively small) is configured to be the same size as the outer diameter of the magnetic cap 40 or slightly larger. Enlarging the outer diameter of the annular magnet 13 more than necessary would not increase the attractive force F.

In other words, good effects are obtained if the inner diameter and outer diameter of the surface 13a of the annular magnet 13 and a ceiling 41 (described below) of the magnetic cap 40 are roughly the same size, or if the surface 13a is configured slightly larger in a radial direction with respect to the ceiling 41.

Figure 4:
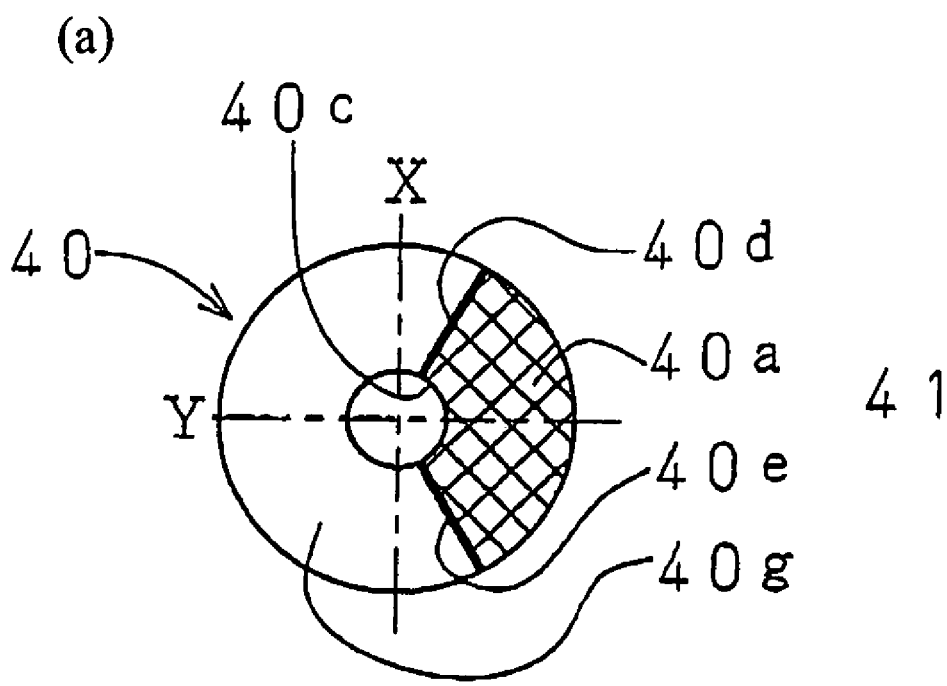
FIG. 4 shows detail of an example of a magnetic material used for the disk drive of the present invention, showing (a) a plan view thereof, and (b) a cross-section of the side along the line AA.
Figure 4:
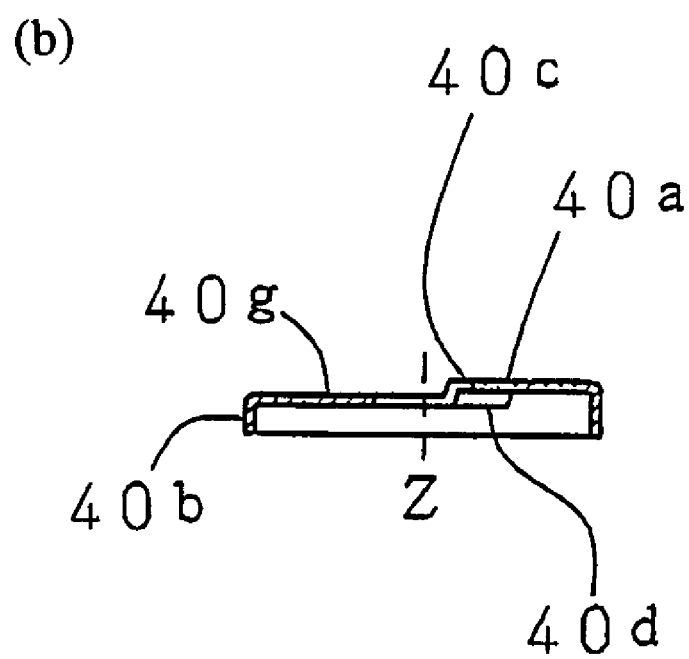

Here, the magnetic cap 40 will be explained in detail with reference to FIG. 4. FIG. 4 (a) illustrates a plan view of the magnetic cap 40, and FIG. 4 (b) illustrates a cross-sectional lateral view along the line AA.

The magnetic cap 40 is formed of a ferromagnetic thin iron plate or the like, for example, a silver top, SECE material or the like having a thickness of 0.25 mm. The magnetic cap 40 is formed in a cap-like shape, and comprises an opposing face 40a (indicated by cross-hatching) which is a flat surface orthogonal to the axis line Z, a lid 40g orthogonal to the axis line Z as well and on a different plane with respect to the opposing face 40a, and a cylindrical attaching part 40b concentric with the axis line Z. The opposing face 40a is opposite to and parallel with the surface 13a of the annular magnet 13.

The opposing face 40a and lid 40g are connected by steps 40d, 40e, and are formed as a consecutive annular shape, thus constituting the ceiling as annular magnetic material. The steps are from 0.1 to 0.2 mm. The steps are formed so that the opposing face 40a projects away from the rotor when compared with the lid 40g.

Specifically, the ceiling 41 is positioned between the end 7f of the bearing 7 and the surface 13a of the annular magnet 13.

Further, the ceiling 41 is connected with the attaching part 40b at the outer periphery thereof, and at the center, a circular opening 40c is formed so that contact is not made with the shaft 12, and the ceiling covers the end face 7f of the bearing 7.

The attaching part 40b has an inner diameter roughly the same size as the outer diameter of the guide 6a of the holder 6, and after the attaching part 40b is fitted onto the end 6e of the guide 6a, it is bonded to the guide 6b, and fixed thereto by crimping or the like. In a case where the inner diameter of the attaching part 40b is slightly smaller than the outer diameter of the guide 6a, it can be fixed thereto by press insertion.

The attaching part 40b is thus used to attach the magnetic cap 40. Alternatively, the ceiling 41 may be directly attached to the end 6e of the bearing holder by welding or the like. Further, when the bearing holder is formed of a magnetic metal plate as described above, the ceiling part 41 may be formed consecutively with the bearing holder.

Because the magnetic cap 40 is formed of a magnetic metal thin plate, such a shape can be formed by pressing. Further, the shape shown in FIG. 4 is such that the opposing face 40a is formed on a ceiling having a uniform thickness. Alternatively, also by pressing, the opposing face 40a may be made thicker and the lid 40g is made thinner, so that the opposing face protrudes.

The ceiling 41 thus configured will not protrude to a large degree from the ends 7e, 6e of the bearing 7 and bearing holder 6. For this reason, the annular magnet 13 can be made small and will not affect the shape of surrounding parts, thereby enabling greater freedom of design without increasing motor size.

Further, when the magnetic cap 40 is formed in a cap-like shape having on the ceiling 41 an opening through which the shaft passes, the magnetic cap 40 can be easily attached to the cylindrical attaching part 40b without need to increase the size of the ceiling 41.

Further, because this magnetic cap 40 is formed in an annular shape so that the opposing face 40a and lid 40g are connected with each other when viewed from the rotation shaft center Z direction, and cover the end 7f of the bearing 7, the scattering of oil impregnated in the bearing 7 is prevented.

The opposing face 40a is formed linearly symmetrically along the axis line Y. In the case of the present embodiment, the opposing face 40a is formed at an angle of 60⌐ (opening angle of 120⌐) with respect to the axis line YY. The width of the opposing face 40a (difference between the radii of the cylindrical part 40b and opening 40c) is conformed to the annular magnet 13 opposite thereto, and determined as appropriate depending on the desired attractive force F. In this case, it is desirable that the surface 13a of the annular magnet 13 have the same width as that of the ring surface or larger. Further, good effects are obtained if the surface 13a is opposite to and parallel with the opposing face 40a. If the differential between the lid 40g and opposing face 40a is secured, the lid 40g does not have to be flatter than the opposing face 40a.

The annular magnet 13 and opposing face 40a operate to exert the attractive force F on the rotor R in the Z direction. Because the opposing face 40a is symmetrical along the axis line Y, the resultant force acts along the axis line Y. According to the present embodiment, the attractive force F works so that the rotor R is made eccentric in the direction moving away from the pickup P, and the direction of such eccentricity conforms to the axis line Y.

Further, because the differential between the opposing face 40a of the magnetic cap 40 and lid 40g is from 0.1 to 0.2 mm, the annular magnet 13 also works on the lid 40g. Because the attractive force F works to make the rotor R eccentric, and the circular opposing face 40a and lid 40g exert the attractive force in the rotating shaft Z direction, the rotation of the rotor R is stable.

The above embodiment explained a radial air-gap type constitution for outer rotor type brushless motors, but the present invention can be used in an outer rotor type axial air-gap type motor. When the rotor is configured as an axial air-gap type, it can be used with a drive magnet and annular magnet.

Further, as cap material for the magnetic cap, in addition to a magnetic metal plate, resin having magnetic powder mixed therein may be used.

Legends:

1: Disk drive
6: Bearing holder
7: Metal bearing
40: Magnetic cap
13: Annular magnet
M: Spindle motor -continued Legends:

P: Pickup
C: Rotation center
X, Y, Z: Axis lines

What is claimed is:

1. A spindle motor, comprising:
 a stator;
 a rotor including a rotating shaft;
 a cylindrical bearing disposed on the stator supporting the rotating shaft;
 a magnet disposed on a surface of the rotor orthogonal with the rotating shaft at a position, said magnet including an annular part positioned concentric with the rotating shaft; and
 a magnetic cap covering a rotor-end side of the bearing and opposing the annular part, at least a ceiling portion of said magnetic cap being positioned between the rotor-end side of the bearing and the magnet, said magnetic cap including a projected portion which is disposed within a sector of said at least the ceiling portion of the magnetic cap, said magnetic cap being configured such that an outer surface of said projected portion facing said magnet is located closer to said magnet than a remaining sector of said at least a ceiling portion of the magnetic cap.

2. A spindle motor according to claim 1, wherein:
 a radius of said annular part of the magnet is larger in size than a corresponding radius of said rotor-side end of the bearing.

3. A spindle motor according to claim 1, wherein:
 a radius of said annular part of the magnet generally matches in size a corresponding radius of said rotor-side end of the bearing.

4. A spindle motor according to claim 1, wherein:
 said magnetic cap is generally annular in shape; and
 said magnetic cap includes a cylindrical part concentric with the rotating shaft formed at an outer periphery thereof and which facilitates attachment of the magnetic cap to the bearing by one of mechanical deformation and press fitting.

5. A spindle motor according to claim 1, wherein said sector is a minor sector.

6. A spindle motor according to claim 5, wherein said sector spans an arc of approximately 60°.

7. A spindle motor according to claim 1, wherein a differential between said projected portion and said remaining sector is between about 0.1 and about 0.2 mm.

8. A spindle motor according to claim 1, wherein said magnetic cap is at least partially comprised of a ferromagnetic material.

9. A spindle motor according to claim 1, wherein said magnetic cap is at least partially comprised of a resin having magnetic powder mixed therein.

10. A spindle motor according to claim 1, wherein a configuration of said magnetic cap is formed by pressing.

11. A spindle motor according to claim 1, further comprising a bearing holder, at least a portion of said magnetic cap being formed integral with said bearing holder.

12. A spindle motor according to claim 1, wherein said ceiling portion includes different regions of relative thickness.

13. A spindle motor according to claim 12, wherein said projected portion corresponds to a region of the different regions which is relatively thick as compared to a remainder of the ceiling portion.

14. A disk drive device comprising:
 a spindle motor for rotatably driving a disk-shaped recording medium when received thereto, the spindle motor including a stator, a rotor including a rotating shaft, a cylindrical bearing disposed on the stator supporting the rotating shaft, a magnet disposed on a surface of the rotor orthogonal with the rotating shaft at a position, said magnet including an annular part positioned concentric with the rotating shaft, and a magnetic cap covering a rotor-end side of the bearing and opposing the annular part, at least a ceiling portion of said magnetic cap being positioned between the rotor-end side of the bearing and the magnet, said at least the ceiling portion including a projected portion having an outer surface facing said magnet which is located closer to said magnet than a remainder of said at least the ceiling portion; and
 a read head movable along a first axis orthogonally intersecting a central rotational axis of the spindle motor, said projected portion being oriented orthogonal with the central rotational axis, symmetrical along the first axis, which is parallel with the disk-shaped recording medium, and asymmetrical with respect to a second axis line that intersects the central rotational axis at right angles.

15. A disk drive device according to claim 14, wherein said projected portion spans a minor sector of said at least the ceiling portion.

16. A disk drive device according to claim 14, wherein a differential between said projected portion and said remainder of said at least the ceiling portion is between about 0.1 and about 0.2 mm.

17. A disk drive device according to claim 14, wherein a radius of said annular part of the magnet generally matches in size a corresponding radius of said rotor-side end of the bearing.

* * * * *